(12) United States Patent
Fritz et al.

(10) Patent No.: US 11,603,496 B2
(45) Date of Patent: Mar. 14, 2023

(54) PROCESS AND PLANT FOR PRODUCING LIQUEFIED NATURAL GAS

(71) Applicant: Linde GmbH, Pullach (DE)

(72) Inventors: Helmut Fritz, Munich (DE); Werner Leitmayr, Neuburg/Donau (DE); Tobias Keller, Feldkirchen-Westerham (DE); Christian Voss, Geretsried (DE)

(73) Assignee: Linde GmbH, Pullach (DE)

( * ) Notice: Subject to any disclaimer, the term of this patent is extended or adjusted under 35 U.S.C. 154(b) by 270 days.

(21) Appl. No.: 16/772,193

(22) PCT Filed: Dec. 3, 2018

(86) PCT No.: PCT/EP2018/025307
§ 371 (c)(1),
(2) Date: Jun. 12, 2020

(87) PCT Pub. No.: WO2019/115014
PCT Pub. Date: Jun. 20, 2019

(65) Prior Publication Data
US 2021/0071091 A1      Mar. 11, 2021

(30) Foreign Application Priority Data
Dec. 12, 2017   (EP) ................................... 17020569

(51) Int. Cl.
*F25J 3/02*      (2006.01)
*C10G 5/06*      (2006.01)
(Continued)

(52) U.S. Cl.
CPC ............. *C10G 5/06* (2013.01); *B01D 53/047* (2013.01); *C10G 5/02* (2013.01); *C10L 3/101* (2013.01);
(Continued)

(58) Field of Classification Search
CPC ........ F25J 3/0233; F25J 3/0242; F25J 3/0247; F25J 2205/40; F25J 2205/64; F25J 2230/20; B01D 53/047
See application file for complete search history.

(56) References Cited

U.S. PATENT DOCUMENTS

| | | | | |
|---|---|---|---|---|
| 3,735,600 A | * | 5/1973 | Dowdell | ................ F25J 1/0283 62/619 |
| 6,610,124 B1 | * | 8/2003 | Dolan | .................... B01D 53/02 95/143 |

(Continued)

OTHER PUBLICATIONS

Hammer, G. et al., "Natural Gas, In: Ullmann's Encyclopedia of Industrial Chemistry," published online Jul. 15, 2006, Wiley-VCH Verlag GmbH & Co., vol. 23, DOI: https://doi.org/10.1002/14356007. a17_073.pub2, pp. 740-792.

(Continued)

*Primary Examiner* — Brian M King
(74) *Attorney, Agent, or Firm* — Millen White Zelano & Branigan, PC; Brion P. Heaney

(57) ABSTRACT

The invention relates to a process (100) for producing liquefied natural gas using a feedstock mixture that contains at least methane, one or more components boiling at a temperature lower than methane and one or more hydrocarbons boiling at a temperature higher than methane, wherein the hydrocarbon(s) boiling at a temperature higher than methane comprise one or more hydrocarbons freezing at a higher temperature, with a freezing point higher than −50° C. According to the invention the feedstock mixture is fed into a pressure swing adsorption process (10), in which a first fraction containing methane and a second fraction containing methane are formed, the first fraction containing methane contains, in addition to the methane, at least the predominant portion of the components of the feedstock mixture that boil more readily than methane and is low in or (Continued)

free from the hydrocarbons boiling less readily than methane, and the second fraction containing methane contains, in addition to the methane, at least the predominant portion of the hydrocarbons from the feedstock that boil less readily than methane and is low in or free from the components that boil more readily than methane, and the first fraction containing methane, or a portion thereof, is supplied for liquefaction (20). The invention also relates to a corresponding plant.

13 Claims, 1 Drawing Sheet

(51) Int. Cl.
    *B01D 53/047*     (2006.01)
    *C10G 5/02*     (2006.01)
    *C10L 3/10*     (2006.01)

(52) U.S. Cl.
    CPC ........... *F25J 3/0209* (2013.01); *F25J 3/0233* (2013.01); *F25J 3/0242* (2013.01); *F25J 3/0247* (2013.01); *B01D 2256/245* (2013.01); *B01D 2257/702* (2013.01); *C10L 2290/542* (2013.01); *C10L 2290/543* (2013.01); *F25J 2205/40* (2013.01); *F25J 2205/64* (2013.01); *F25J 2230/20* (2013.01); *F25J 2245/02* (2013.01); *F25J 2260/20* (2013.01)

(56) References Cited

U.S. PATENT DOCUMENTS

| | | | | |
|---|---|---|---|---|
| 2010/0024476 | A1* | 2/2010 | Shah | F25J 3/067 95/41 |
| 2013/0186133 | A1* | 7/2013 | Ploeger | C10L 3/101 62/636 |
| 2017/0045290 | A1* | 2/2017 | Ploeger | B01D 63/02 |
| 2017/0336137 | A1* | 11/2017 | Mak | F25J 1/0228 |

OTHER PUBLICATIONS

International Search Report of the International Searching Authority for PCT/EP2018/025307 dated Jan. 7, 2019.

English translation of International Search Report of the International Searching Authority for PCT/EP2018/025307 dated Jan. 7, 2019.

\* cited by examiner

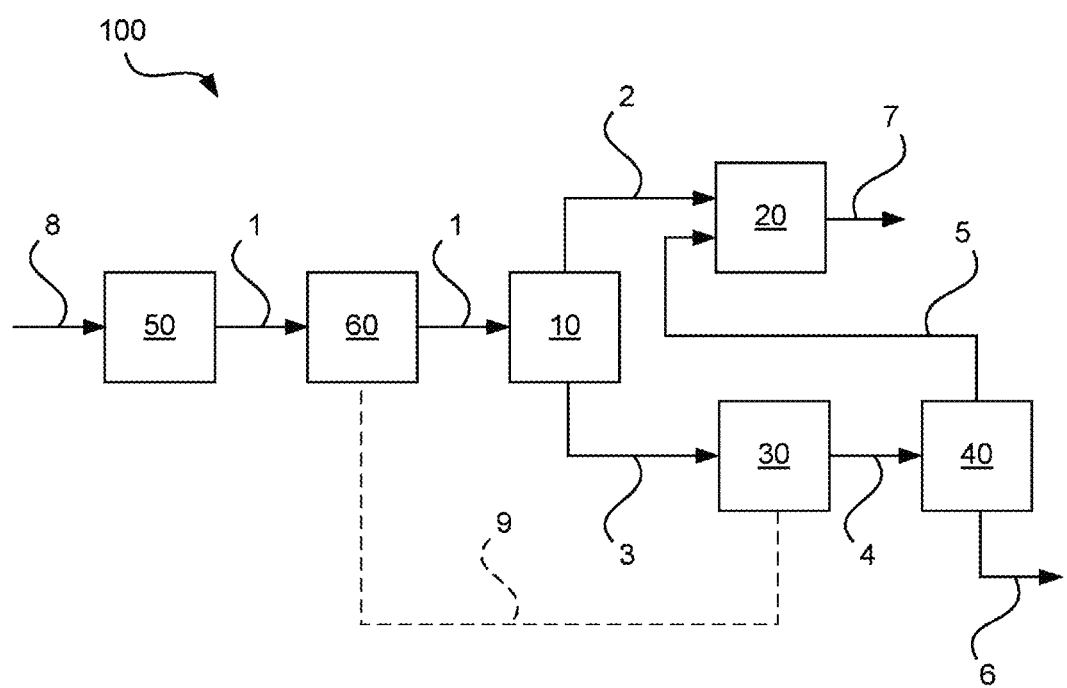

PROCESS AND PLANT FOR PRODUCING LIQUEFIED NATURAL GAS

The present invention relates to a process and to a plant for producing liquefied natural gas according to the respective preambles of the independent claims.

PRIOR ART

Processes and plants for liquefying natural gas, and thus for producing liquefied natural gas, are known from the prior art in various embodiments. For an overview, reference is made to the relevant technical literature, e.g., the article "Natural Gas" in Ullmann's Encyclopedia of Industrial Chemistry, published online on Jul. 15, 2006, DOI: 10.1002/14356007.a17_073.pub2, in particular Section 3.3 "Production," The liquefaction of natural gas is carried out, in particular, in order to improve its transportability, in particular in tanker ships. The liquefied gas produced by means of corresponding processes and plants is frequently referred to as LNG (liquefied natural gas). This is a cryogenic liquid containing predominantly or exclusively methane. Liquefied natural gas typically contains only a portion of the components contained in the (raw) natural gas.

During the liquefaction of natural gas to liquefied natural gas, dislocations and blockage of parts of the plant can already occur in the presence of very small amounts of certain hydrocarbon species, hereinafter referred to as "critical." This can lead to complete failure of the plants involved.

Critical hydrocarbon species are, in particular, benzene and neopentane, which, as pure substances, already freeze to solid at comparatively high temperatures of +5° C. and −16.6° C., respectively. In contrast, solid formation does not take place if, in addition to the critical hydrocarbon species, there are still further hydrocarbons in sufficient quantity in the natural gas to be liquefied which condense but do not solidify in the relevant temperature range. These accompanying components can keep these critical hydrocarbon species in solution and prevent or retard solidification, thereby allowing deposition or elution in solution. After the deposition or elution, the natural gas can be cooled down to the very low temperatures required for liquefaction, without having to fear dislocations due to the critical hydrocarbon species.

In order to allow elution, the partial pressure or the concentration of the components suitable as solvents must be high enough that they already condense at temperatures above the solidification temperature of the critical hydrocarbon species and are present as a liquid. This can be fed in countercurrent to the gas in, for example, washing columns, as a result of which the critical hydrocarbon species can be eluted.

However, as also explained below, a corresponding procedure for removing critical hydrocarbon species is not always possible. Otherwise separating corresponding critical hydrocarbon species is also conventionally not possible or is impractical.

The object of the present invention is therefore to enable or more reliably design natural gas liquefaction when critical hydrocarbon species are present, even in such situations.

DISCLOSURE OF THE INVENTION

Against this background, the present invention proposes a process and a plant with the respective features of the independent claims. Preferred embodiments of the present invention are the subject matter of the dependent claims and the following description.

Before explaining the features and advantages of the present invention, some of the principles and the terms used are discussed.

Liquid and gaseous mixtures may, in the language used herein, be rich or low in one or more components, wherein "rich" refers to a content of at least 99%, 99.5%, 99.9%, or 99.99%, and "low" refers to a content of at most 1%, 0.1%, or 0.01% on a molar, weight, or volume basis. The term "predominantly" may correspond to the definition of "rich."

Component mixtures in the language used herein may also be enriched with or depleted of one or more components, wherein these terms refer to a corresponding content in another component mixture, using which the component mixture under consideration was formed. A component mixture is "enriched" if it has at least 1.5 times, 2 times, 5 times, 10 times, 100 times, or 1,000 times the content of the designated component(s), and is "depleted" if it has at most 0.75 times, 0.5 times, 0.1 times, 0.01 times, or 0.001 times the content of the designated component(s).

The present application uses the terms "pressure level" and "temperature level" to characterize pressures and temperatures, which means that corresponding pressures and temperatures in a corresponding plant do not have to be used in the form of exact pressure or temperature values in order to realize the inventive concept. However, such pressures and temperatures are typically in certain ranges whose maximum and minimum values differ by, for example, not more than 1%, 5%, 10%, 20%, or even 50%.

In this case, corresponding pressure levels and temperature levels can lie in disjointed ranges or in ranges which overlap one another. In particular, pressure levels, for example, include unavoidable or expected pressure losses, for example due to cooling effects. The same applies to temperature levels. The pressure values indicated here with respect to "absolute pressure levels" are absolute pressures in bar (abs.) in each case.

ADVANTAGES OF THE INVENTION

As already mentioned above, removal of critical hydrocarbon species prior to a natural gas liquefaction by a deposition or elution thereof is possible if, in addition to the critical hydrocarbon species, further hydrocarbons suitable as solvents for the critical hydrocarbon species are present in sufficient quantity. These components suitable as solvents must condense in the relevant temperature range but must not solidify. As mentioned, the partial pressure or the concentration of the components suitable as solvents must be high enough that they already condense at temperatures above the solidification temperature of the critical hydrocarbon species and are present as a liquid.

In contrast, a corresponding deposition or elution is not possible if the content of components suitable as solvents is not high enough and the condensation thereof does not take place above the solidification temperature on account of the low partial pressure.

Natural gases which, for example, have an unfavorable ratio of neopentane and butanes therefore cannot conventionally be liquefied into liquefied natural gas, because neopentane already solidifies before sufficient quantities of butanes or other hydrocarbons liquefy and keep the neopentane in solution and thus mobile. In contrast to benzene or hydrocarbons having seven and/or hydrocarbons having eight or more carbon atoms, however, neopentane cannot be purposefully or selectively removed from natural gas by adsorption.

In contrast, by the measures now proposed according to the invention, it is also possible to liquefy natural gases which are conventionally regarded as unfavorable for liquefaction and contain said critical hydrocarbon species, without having to fear a dislocation of parts of the plant and a corresponding plant failure. In this way, further natural gases can be made accessible to natural gas liquefaction by the use of the invention. By means of the present invention, natural gas with a high neopentane and/or benzene content and at the same time a low content of propane and/or butane can be conditioned in such a way that it can be liquefied, stored, and transported at the lowest temperatures. As a result, natural gases having these properties can be made accessible to exploitation and marketing. Practically all of the natural gas or feedstock mixture can be utilized in this case, in particular by the measures advantageously proposed in addition to the pressure swing adsorption process, in particular the thermal separation. By using only the pressure swing adsorption process, however, approximately 70% of the heating value is accessible.

The present invention is based, in particular, upon the realization that the natural gas to be liquefied, or a corresponding feedstock mixture, which can be obtained, in particular, by suitable conditioning of natural gas and which contains corresponding critical hydrocarbon species, is advantageously subjected to a pressure swing adsorption process (PSA) and separated into a fraction containing predominantly or exclusively methane and possibly components boiling at a temperature lower than methane (also referred to as C1 minus fraction, and subsequently also referred to as "first" fraction), and a fraction containing predominantly or exclusively methane and components boiling at a temperature higher than methane (also referred to as C1 plus fraction, and subsequently also referred to as "second" fraction).

The C1 minus fraction remains at a comparatively high pressure level, at which it leaves the pressure swing adsorption process, and can be supplied at this pressure level for liquefaction. It is, advantageously, virtually free from all hydrocarbons of the natural gas used which boil at a temperature higher than methane. In contrast, the C1 plus fraction advantageously contains virtually all hydrocarbons of the natural gas used which boil at a higher temperature, including the critical hydrocarbon species, such as neopentane or benzene and a greatly reduced methane portion compared with the natural gas or the feedstock mixture used. This fraction which accumulates at comparatively low pressure can, in particular, be compressed again and supplied for thermal separation. Specific features and advantages of a corresponding treatment of this fraction are discussed further below.

Overall, the present invention proposes a process for producing liquefied natural gas using a feedstock mixture containing at least methane, one or more components boiling at a temperature lower than methane, and one or more hydrocarbons boiling at a temperature higher than methane. The feedstock mixture can, in the context of the present invention, as also explained in more detail below, be obtained from natural gas, in particular, by conditioning.

The hydrocarbon(s) contained in the feedstock mixture that boil at a temperature higher than methane comprise one or more hydrocarbons having a freezing point of greater than −50° C., especially of −30° C. to +30° C., more especially of −20° C. to +20° C. The freezing point in each case relates to the pure substance at standard conditions or to a pressure level at which a natural gas liquefaction is typically carried out, especially an absolute pressure level of 20 to 40 bar, especially of 25 to 30 bar. Hydrocarbons having freezing points in the stated ranges are also referred to below as "high-freezing" hydrocarbons. These include, in particular, the compounds neopentane and benzene, referred to previously as "critical hydrocarbon species."

As also explained below, however, in addition to the high-freezing hydrocarbons, it is also possible for further hydrocarbons which boil at a temperature higher than methane to be present, in particular ethane and/or propane and/or butane and one or more corresponding unsaturated hydrocarbons.

According to the invention, the feedstock mixture is fed to a pressure swing adsorption process, in which a first fraction containing methane and a second fraction containing methane are formed. The pressure swing adsorption process operates in a fundamentally known manner and using known adsorbents suitable for the purpose in question here.

In the case of the pressure swing adsorption process, a feedstock mixture is introduced in gaseous form at an elevated pressure level into one or more containers which is or are filled with one or more adsorbents, so that the latter is or are flowed through. One or more components of the feedstock mixture is or are adsorbed to the adsorbent(s). At the outlet of the container or containers, a fraction can be taken which is depleted with respect to the feedstock mixture of the adsorbing components, in particular also essentially free thereof, and enriched with the non-adsorbing components. This fraction corresponds here to the first fraction containing methane.

After a while, the adsorbent(s) are saturated in such a way that no further adsorption is possible or this is no longer sufficient for the respective separation task. Therefore, an outlet for the previously formed fraction, which is depleted with respect to the feedstock mixture of the adsorbing components, in particular also substantially free thereof, and enriched with the non-adsorbing components, is now closed. Pressure is reduced in the container or containers to a lower pressure level. In this process, the previously adsorbed component(s) is or are desorbed again and can be discharged via a corresponding outlet. Two alternatingly loaded and discharged containers allow continuous operation. In order to expel the supernatant of desorbed components, it is also possible to rinse with a portion of the desired product in order to avoid impurities.

In the context of the present invention, the pressure swing adsorption process is carried out in such a way that the first fraction containing methane contains, in addition to the methane, at least the predominant portion of the components of the feedstock mixture that boil more readily than methane and is low in or free from the hydrocarbons boiling less readily than methane. The latter adsorb preferentially to the adsorbent(s) used, while the components which boil more readily than methane do not adsorb. Methane partially adsorbs. In addition to the methane, the second fraction containing methane, in contrast, contains at least the predominant portion of the hydrocarbons of the feedstock mixture that boil less readily than methane and is low in or free from the components boiling more readily than methane.

The first fraction containing methane is, advantageously, substantially free from the high-freezing components. In particular, a (residual) content of the high-freezing component(s) is . . . It is therefore supplied for liquefaction.

Depletion of the high-freezing components ensures that they do not freeze out in the liquefaction and therefore block parts of the plant.

In the context of the present invention, the first fraction containing methane is, advantageously, provided by means of the pressure swing adsorption process at an absolute pressure level of 20 to 40 bar, in particular of 25 to 35 bar, e.g., about 28 bar, and the first fraction containing methane, or the portion thereof supplied for liquefaction, is supplied for liquefaction at this absolute pressure level. In this way, further compression downstream of the pressure swing adsorption process is dispensed with, and a direct supply of the first fraction containing methane, or the portion thereof supplied for liquefaction, can take place.

In contrast, the second fraction containing methane is typically provided in the pressure swing adsorption process at an absolute pressure level of 0.1 to 5 bar, in particular of 1 to 2 bar. A subatmospheric pressure level is present, in particular, in the case of a so-called vacuum pressure swing adsorption, as generally known from the prior art. The second fraction containing methane, or a portion thereof, is therefore, advantageously, supplied for compression prior to further processing in order to be able to be brought to a pressure suitable for further processing.

Advantageously, the second fraction containing methane, or the portion thereof supplied for compression, is at least partially supplied after the compression for thermal separation, in particular distillation or rectification in one or more suitable columns. In this thermal separation, methane in particular contained in the second fraction or a corresponding portion thereof, and other lighter hydrocarbons can be separated from the high-freezing hydrocarbons.

The hydrocarbons boiling less readily than methane in the feedstock mixture and in the second fraction containing methane comprise, in particular, propane and/or at least one butane, and the compression is, advantageously, selected as a function of the content of propane and/or of the at least one butane in the second fraction containing methane, or the portion thereof supplied for thermal separation. As a result of the methane depletion in the pressure swing adsorption process and the subsequent compression of the second fraction containing methane, or portion thereof, the partial pressures, e.g., of the propane or of the butanes, can be increased in such a way that liquefaction is possible at temperatures above −16° C., and propane and/or butane can be used as washing agent or solvent for removing, for example, neopentane in the manner explained at the outset. The compression pressure is selected to be correspondingly high and, if applicable, matched to other process requirements, e.g., high enough that, in particular, a light fraction obtained in a corresponding separation can be supplied for liquefaction.

In other words, within the scope of the present invention, a gaseous third fraction and a liquid fourth fraction are, advantageously, formed in the thermal separation, wherein the gaseous third fraction contains at least methane and is low in or free from the high-freezing hydrocarbons. A portion of the gaseous third fraction is also, particularly advantageously, subjected to liquefaction. A further portion can be used, in particular, as a return flow in the thermal separation, which can be carried out using one or more rectification columns.

The methane depletion and thus the partial pressures and a separation temperature in the thermal separation can be adjusted by targeted recirculation and re-compression within the pressure swing adsorption process. This can be effected by the final pressure of a re-compression and by a proportion of the first methane-containing fraction, which is returned to the pressure swing adsorption process. In the context of the present invention, a portion of the first fraction containing methane can thus also be returned to the pressure swing adsorption process. The return can reduce the methane content in the first fraction containing methane and thus increase the temperature in the low-temperature separation. The proportion of the first methane-containing fraction which is returned to the pressure swing adsorption process can be, for example, 10 to 80%, in particular 30 to 70% or 50 to 70%, e.g., approx. 68%, of the first fraction containing methane.

In the context of the present invention, different thermal separations can be used. The thermal separation can thus be carried out using a rectification column, which is carried out in such a way that hydrocarbons having two or less carbon atoms transition at least predominantly into an overhead gas, and that hydrocarbons having three or more carbon atoms at least predominantly transition into a bottoms liquid. The thermal separation can, alternatively, also be carried out using a rectification column which is operated in such a way that hydrocarbons having three or less carbon atoms transition at least predominantly into an overhead gas, and that hydrocarbons having four or more carbon atoms at least predominantly transition into a bottoms liquid.

Depending upon the thermal separation used and, possibly, further conditioning processes, it is also possible within the scope of the present invention to form further liquid component mixtures, for example, liquefied petroleum gas (LPG) with predominantly propane and butanes.

In this case, the overhead or condensation temperature of the rectification columns used in each case is below the respective solidification temperature of the high-freezing hydrocarbons, as long as there is sufficient spacing or a sufficient number of bottoms between feed point and condenser, and a sufficient temperature profile is formed in the column. The actual washing agent, by means of which the high-freezing hydrocarbons are eluted, is formed within the column by hydrocarbons, having two carbon atoms and methane, which flow down from the head.

As already mentioned, in the context of the present invention, the feedstock mixture can be obtained by conditioning natural gas, wherein the conditioning can comprise, in particular, drying and carbon dioxide removal.

The feedstock mixture is, advantageously, provided at a first pressure level and fed to the pressure swing adsorption process at a second pressure level, wherein the feedstock mixture is at least partially brought to the second pressure level by expansion in one or more expansion machines. The second pressure level corresponds, in particular, to the upper pressure level of the pressure swing adsorption process, and thus also to the already explained pressure level at which the first fraction containing methane can be dispensed. With particular advantage, one or more compressors used for compressing the second fraction containing methane, or the portion thereof supplied for compression, can be driven by means of the one or more expansion machines. In this way, correspondingly released mechanical work can be utilized in a sensible way. The outlet temperature, i.e., the inlet temperature into the pressure swing adsorption process, can be adjusted by adjusting the temperature prior to the expansion.

According to an advantageous embodiment of the invention, the conditioning of the natural gas can, in particular, also comprise a temperature swing adsorption process. In this way, higher hydrocarbons, in particular, can be removed, and a bottoms product of the rectification column used in the thermal separation can be appropriately conditioned.

The present invention also extends to a plant for the production of liquefied natural gas using a feedstock mixture, concerning the features of which reference is made to the corresponding independent claim.

A corresponding plant is, advantageously, set up for carrying out a process as explained above in different embodiments and in each case has specifically adapted means for this purpose. Reference is therefore made to the respective explanations, in particular with regard to the respective advantages.

An embodiment of the invention is explained in more detail below with reference to the attached drawing.

BRIEF DESCRIPTION OF THE DRAWINGS

FIG. 1 shows a process according to an embodiment of the invention in the form of a highly simplified process diagram.

DETAILED DESCRIPTION OF THE DRAWING

In FIG. 1, a process for producing liquefied natural gas according to an embodiment of the invention in the form of a highly simplified process diagram is illustrated and is designated as a whole by 100.

In the process 100, a feedstock mixture, illustrated here in the form of a material stream 1, which contains at least methane, one or more components boiling at a temperature lower than methane, and one or more hydrocarbons boiling at a temperature higher than methane, is fed to a pressure swing adsorption process 10. As mentioned, the hydrocarbon or hydrocarbons boiling at a temperature higher than methane comprise one or more high-freezing hydrocarbons with a freezing point of more than −50° C.

In the pressure swing adsorption process 10, a first fraction containing methane, illustrated here in the form of a material stream 2, and a second fraction containing methane, illustrated here in the form of a material stream 3, are formed.

The first fraction containing methane, or the material stream 2, contains, in addition to the methane, at least the predominant portion of the components of the feedstock mixture that boil more readily than methane and is low in or free from the hydrocarbons boiling less readily than methane, as explained. As also explained, the second fraction containing methane, or the material stream 3, contains, in addition to the methane, at least the predominant portion of the hydrocarbons of the feedstock mixture that boil less readily than methane and is low in or free from the components boiling more readily than methane.

Because the first fraction containing methane is, advantageously, free or substantially free from the critical hydrocarbon species explained above, it, or the material stream 2, can be supplied directly for liquefaction 20. The first fraction containing methane, or the material stream 2, is provided by means of the pressure swing adsorption process 10 at an absolute pressure level which permits a direct supply for liquefaction 20.

The second fraction containing methane, or the material stream 3, is provided in the pressure swing adsorption process 10 at a significantly lower absolute pressure level and is therefore supplied for compression 30. The second fraction containing methane, or the portion thereof supplied for compression 30, is at least partially supplied for thermal separation 40 after the compression 30, now illustrated in the form of a material stream 4.

Details of the thermal separation 40 and its embodiments have already been explained several times. In particular, a gaseous third fraction, illustrated here in the form of a material stream 5, and a liquid fourth fraction, illustrated here in the form of a material stream 6, are formed in the thermal separation, wherein the gaseous third fraction, or the material stream 5, contains at least methane and is low in or free from the high-freezing hydrocarbons. It can therefore be supplied for liquefaction 20. In contrast, the liquid fourth fraction, or the material stream 6, can be extracted in order to obtain further products from the process 100.

In particular, in the context of the present invention, a liquefied natural gas fraction, here illustrated in the form of a material stream 7, can be formed and extracted from the process 100.

The feedstock mixture, or the material stream 1, can be obtained by conditioning 50 natural gas, which is illustrated here in the form of a material stream 8, wherein the conditioning 50 can, in particular, comprise drying and carbon dioxide removal. The feedstock mixture, or the material stream 1, can be provided, in particular, at a first pressure level and fed to the pressure swing adsorption process 10 at a second pressure level. The feedstock mixture can be at least partially brought to the second pressure level by expansion 60 in one or more expansion machines. In this case, the expansion 60 and the compression 30 can, in particular, be coupled, as illustrated here in the form of a dashed connection 9. In particular, one or more compressors used for compressing 30 the second fraction containing methane, or the portion thereof supplied for compression 30, and thus the material stream 3, can be driven by means of the one or more expansion machines, which perform the expansion 60.

The invention claimed is:

1. A process (100) for producing liquefied natural gas using a feedstock mixture that contains at least methane, one or more components boiling at a temperature lower than methane, and one or more hydrocarbons boiling at a temperature higher than methane, wherein the hydrocarbon(s) boiling at a temperature higher than methane have one or more high-freezing hydrocarbons with a freezing point higher than −50° C., said process comprising:

feeding the feedstock mixture to a pressure swing adsorption process (10), in which a first fraction containing methane and a second fraction containing methane are formed, wherein the first fraction containing methane contains, in addition to the methane, at least the predominant portion of the components of the feedstock mixture that boil more readily than methane and is low in or free from the hydrocarbons boiling less readily than methane, wherein the second fraction containing methane contains, in addition to the methane, at least the predominant portion of the hydrocarbons of the feedstock that boil less readily than methane and is low in or free from the components boiling more readily than methane, subjecting the first fraction containing methane, or a portion thereof, is to liquefaction (20), obtaining the second fraction containing methane from the pressure swing adsorption process at an absolute pressure level of 0.1 to 5 bar, and subjecting the second fraction containing methane, or a portion thereof, to compression (30), and wherein, after the compression (30), the second fraction containing methane, or the portion thereof supplied for compression (30), is at least partially supplied to thermal separation (40), and the thermal separation (40) is carried out using a rectification column which is operated in such a way that hydrocarbons having less than two carbon atoms transition at least predominantly into an overhead gas, hydrocarbons having two carbon atoms transition at least predominantly into the overhead gas, and hydrocarbons having three or more carbon atoms transition at least predominantly into a bottoms liquid.

2. The process (100) according to claim 1, wherein the first fraction containing methane is provided by means of the pressure swing adsorption process (10) at an absolute pressure level of 20 to 40 bar, and wherein the first fraction containing methane, or the portion thereof supplied to the liquefaction (20), is supplied to the liquefaction (20) at this absolute pressure level.

3. The process (100) according to claim 1, wherein the hydrocarbons boiling less readily than methane in the feedstock mixture and in the second fraction containing methane comprise propane and/or at least one butane, and are selected in the compression (30) as a function of the content of propane and/or of the at least one butane in the second fraction containing methane, or the portion thereof supplied for thermal separation (40).

4. The process (100) according to claim 1, wherein said overhead gas is low in or free from the high-freezing hydrocarbons.

5. The process (100) according to claim 4, wherein a portion of the overhead has is also subjected to liquefaction (20).

6. The process according to claim 1, wherein the overhead temperature of the rectification column is below the solidification temperature of the high-freezing hydrocarbons.

7. A process (100) for producing liquefied natural gas using a feedstock mixture that contains at least methane, one or more components boiling at a temperature lower than methane, and one or more hydrocarbons boiling at a temperature higher than methane, wherein the hydrocarbon(s) boiling at a temperature higher than methane have one or more high-freezing hydrocarbons with a freezing point higher than −50° C., said process comprising:

feeding the feedstock mixture to a pressure swing adsorption process (10), in which a first fraction containing methane and a second fraction containing methane are formed, wherein the first fraction containing methane contains, in addition to the methane, at least the predominant portion of the components of the feedstock mixture that boil more readily than methane and is low in or free from the hydrocarbons boiling less readily than methane, wherein the second fraction containing methane contains, in addition to the methane, at least the predominant portion of the hydrocarbons of the feedstock that boil less readily than methane and is low in or free from the components boiling more readily than methane, subjecting the first fraction containing methane, or a portion thereof, is to liquefaction (20), obtaining the second fraction containing methane from the pressure swing adsorption process at an absolute pressure level of 0.1 to 5 bar, and subjecting the second fraction containing methane, or a portion thereof, to compression (30), and wherein, after the compression (30), the seocnd fraction containing methane, or the portion thereof supplied for compression (30), is at least partially supplied to thermal separation (40), and the thermal separation (40) is carried out using a rectification column which is operated in such a way that hydrocarbons having less than less carbon atoms transition at least predominantly into the overhead gas, hydrocarbons having three carbon atoms transition at least predominantly into an overhead gas, hydrocarbons having less than three carbon atoms transition at least predominantly into the overhead has, and hydrocarbons having four or more carbon atoms transition at least predominantly into a bottoms liquid.

8. The process (100) according to claim 1, wherein the feedstock mixture is obtained by conditioning (50) natural gas, wherein the conditioning (50) comprises drying and carbon dioxide removal.

9. The process (100) according to claim 1, wherein the feedstock mixture is provided at a first pressure level and fed to the pressure swing adsorption process (10) at a second pressure level, wherein the feedstock mixture is at least partially brought to the second pressure level by expansion (60) in one or more expansion machines.

10. The process (100) according to claim 9, wherein one or more compressors used to compress (30) the second fraction containing methane, or the portion thereof supplied for compression (30), are driven by means of the one or more expansion machines.

11. The process (100) according to claim 8, wherein said conditioning (50) comprises a temperature swing adsorption process.

12. The process according to claim 7, wherein the overhead temperature of the rectification column is below the solidification temperature of the high-freezing hydrocarbons.

13. A plant for producing liquefied natural gas using a feedstock mixture containing at least methane, one or more components boiling at a temperature lower than methane, and one or more hydrocarbons boiling at a temperature higher than methane, wherein the hydrocarbon or hydrocarbons boiling at a temperature higher than methane have one or more high-freezing hydrocarbons with a freezing point of more than −50° C., said plant comprising:

means adapted to supply the feedstock mixture to a pressure swing adsorption process (10) and to form there a first fraction containing methane and a second fraction containing methane, wherein the first fraction containing methane contains, in addition to the methane, at least the predominant portion of the components of the feedstock mixture that boil more readily than methane and is low in or free from the hydrocarbons boiling less readily than methane, wherein the second fraction containing methane contains, in addition to the methane, at least the predominant portion of the hydrocarbons of the feedstock mixture that boil less readily than methane and is low in or free from the components boiling more readily than methane, means adapted to supply the first fraction containing methane, or a portion thereof, to liquefaction (20), means for obtaining the second fraction containing methane from the pressure swing adsorption process at an absolute pressure level of 0.1 to 5 bar, and means for sending the second fraction containing methane, or a portion thereof, to one or more compressors (30), and means for sending the second fraction containing methane, or the portion thereof, supplied from the one or more compression (30), to thermal separation (40) in a rectification column wherein the thermal separation (40) separates the second fraction containing methane, into (a) an overhead gas that contains predominantly hydrocarbons having two or less carbon atoms, and a bottoms liquid that contains predominantly hydrocarbons having three or more carbon atoms, or (b) an overhead gas that contains hydrocarbons having three or less carbon atoms, and a bottoms liquid that contains hydrocarbons having four or more carbon atoms.

* * * * *